No. 743,392. PATENTED NOV. 3, 1903.
P. J. LOCKWOOD.
LUBRICATOR OR LUBRICATION SYSTEM.
APPLICATION FILED APR. 19, 1902.
NO MODEL.
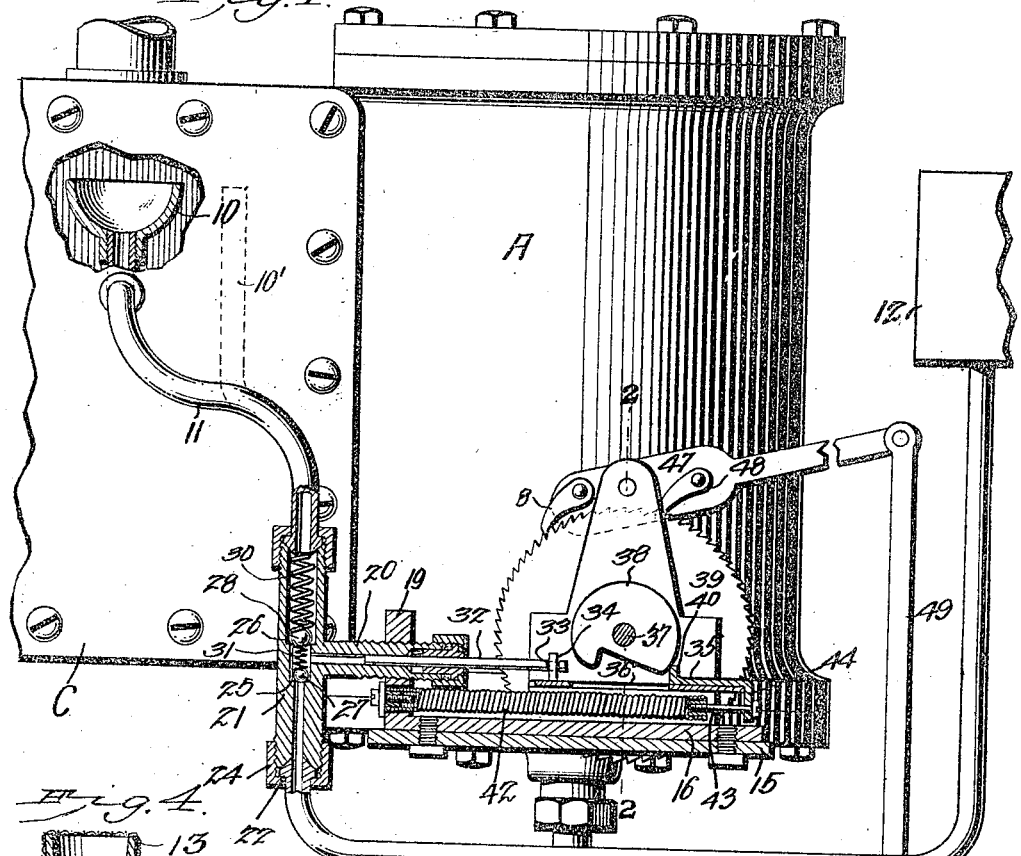
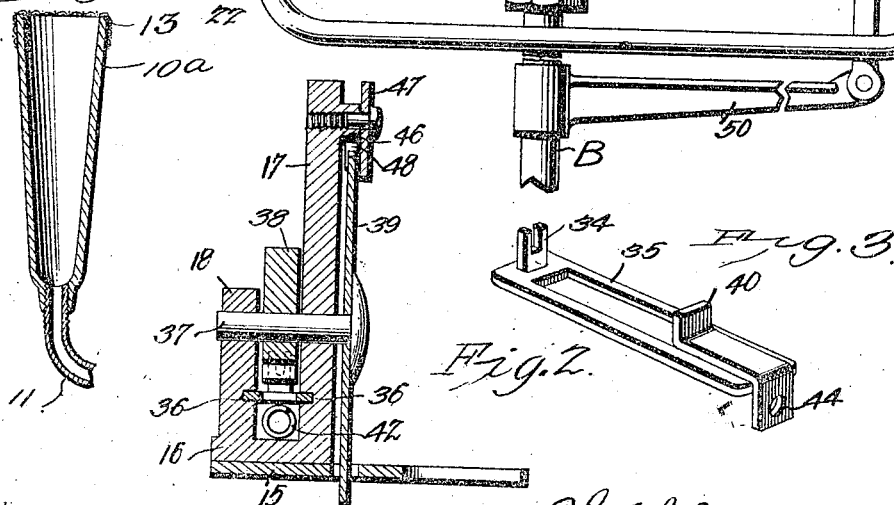
Witnesses
Philo J. Lockwood, Inventor.

No. 743,392.

Patented November 3, 1903.

UNITED STATES PATENT OFFICE.

PHILO J. LOCKWOOD, OF WASHINGTON, DISTRICT OF COLUMBIA.

LUBRICATOR OR LUBRICATION SYSTEM.

SPECIFICATION forming part of Letters Patent No. 743,392, dated November 3, 1903.

Application filed April 19, 1902. Serial No. 103,812. (No model.)

*To all whom it may concern:*

Be it known that I, PHILO J. LOCKWOOD, residing at No. 21 Seventh street S. E., Washington, in the District of Columbia, have invented certain new and useful Improvements in Lubricators or Lubrication Systems; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in devices for lubricating the valves and other movable parts of engines, and has for its principal object to construct an improved form of lubricator or lubrication by which a practically continuous oil-feed is insured, the steam in a steam-engine being employed as the distributing agent for conveying the lubricant to the various parts of the interior of the engine to be lubricated.

The invention maintains a supply of oil in a vessel or pipe situated in the steam-chest or feed-pipe through which steam is passing, the oil vessel being heated by the steam, causing the oil to become in a state of effervescence and in this state passing through holes or apertures out into and mixing with the steam and is carried by the steam to and against the slide-valves and cylinder heads, rings, and walls of the cylinder and other parts to be lubricated.

A still further object of the invention is to provide mechanism for feeding required quantities of oil at regular intervals to the lubricator in the engine or feed pipe through the medium of a spring-propelled plunger, the force of this spring being permitted to act on the plunger at the end of any desired number of revolutions of the engine.

A further object of this invention is to provide an improved form of valve construction for forcing the lubricant to the feed-cup within the engine.

With these and other objects in view the invention consists in the novel construction and arrangement of parts hereinafter described, illustrated in the accompanying drawings, and particularly pointed out in the appended claims.

In the drawings, Figure 1 is an elevation, partially in section, illustrating a portion of a steam-engine and showing the application thereto of a lubricating device embodying my invention. Fig. 2 is a transverse sectional elevation of the lubricating device on the line 2 2 of Fig. 1. Fig. 3 is a perspective view of a detail of construction. Fig. 4 is a sectional elevation illustrating a modified form of oil-feed cup.

Similar characters of reference are employed to indicate corresponding parts throughout the several figures of the drawings.

In the lubrication of interior moving parts of steam-engines it has been attempted to supply oil to the steam-chest either directly or through the feed-pipe in small quantities at regular intervals of time, the result of which has been that the greater portion of the oil has been wasted through the exhaust, lubricating the valves, cylinder-walls and rings at intervals only and requiring the same to run for a time wholly without any lubricant.

It is the object of my invention to overcome these objections and to cause a continuous feeding of lubricant to the moving parts without any cessation and without any increase in the amount of lubricant heretofore used. Now to accomplish this object I place in the steam-chest or feed-pipe supplying the engine with steam a cup or tube, into the bottom of which oil is fed by any known means, which cup or tube becoming heated by the steam causes the oil to boil or effervesce and gradually expand and force itself out of this tube or cup in a continuous flow of oil-spray, in which form it is caught up by the steam and carried regularly and continuously through the engine and against all the parts to be lubricated. While the drawings show the lubricator situated within the steam-chest, it is to be understood that it may be placed in a pipe or in any other inclosure through which a current of steam is passing to the engine without departing from my invention. Also this cup or tube in which the oil is heated, expanded, and caused to effervesce may be surrounded with gauze or metal screening 13, and in this way made larger and provided with an indefinite number of apertures out of which the oil may be forced, to the end that a greater surface may be exposed to the action of the steam and likewise a more thorough distribution effected. The cup or tube should be placed immediately in the path of the passing steam.

Referring to the drawings, A indicates the cylinder of a steam-engine having a piston-rod B and a steam-chest C, the latter being provided with any form of valves for controlling the flow of steam to and from the engine. In the steam-chest is placed a tube, cup, or other vessel 10, the lower portion of which is connected by a pipe 11 to an oil-reservoir 12, from which oil is fed by suitable mechanism to the lubricator. This cup and its connecting-pipe are preferably formed of metal or other good conductor of heat to permit the action of the heat of the steam on the oil. The connecting-pipe 11, being a part of the interior pipe, will be heated for some little distance from the steam-chest by the conductive properties of the metal, this distance depending upon conditions, so that the entering oil will be gradually heated to a higher and higher degree until it comes in contact with the steam. In practice it is found that the oil when it reaches the steam is practically oil-vapor and is carried against all portions of the interior of the engine. In this manner the supply of oil from the cup is constant and the movable parts of the engine will be slightly lubricated at each stroke of the engine, resulting in much better and smoother operation with an expenditure of much less lubricant than is now ordinarily employed by the usual methods. In order to prevent the back-flow of oil under the pressure of the steam and to insure the regular feeding of oil to the cup, I preferably employ a pumping mechanism of the character illustrated in the drawings.

To the lower cylinder-head, or at any other suitable point depending upon the construction and arrangement of the engine, is secured a suitable supporting-plate 15, on which is arranged a frame comprising a base 16 and three standards 17, 18, and 19. In the standard 19 is secured a small cylinder 20, which is secured to or formed integral with a valve-chamber 21, connected in the oil-supply pipe 11, the ends of said pipe being provided with annular shoulders or flanges 22, held to the opposite threaded ends of the valve-chamber by threaded and flange caps 24. In the valve-chamber are formed two valve-seats 25 and 26, one being somewhat larger than the other, and the cylinder 20 communicating with the valve-chamber at a point between the two valve-seats. On the valve-seat 25 is placed a ball-valve 27, having an opening movement in the direction of the steam-chest, feed-pipe, and feed-cup, and on the valve-seat 26 is placed a ball-valve 28, having a similar opening movement. The valve 28 is held to its seat by a heavy compression-spring 30, a lighter spring 31 being placed between the valves 27 and 28 to hold the smaller valve to its seat, while permitting an opening movement of the smaller valve without effecting a corresponding movement of the larger valve. Both of these valves being arranged to open only in the direction of the oil-cup serve to prevent any backflow of oil under the steam-pressure; yet other check-valves may be placed in the line of pipe leading from the pump to the steam-chest and feed-cup.

In the cylinder 20 is a plunger 32, the end of the cylinder being provided with suitable packing and a gland-nut for holding the packing in position. The outer end of the plunger 32 is grooved or notched, as indicated at 33, for the reception of the members of a slotted lug 34, carried by a slide 35, the latter being guided in alining grooves or notches 36, formed in the adjacent faces of the standards 17 and 18.

In the standards 17 and 18 are suitable bearings for the reception of a small shaft 37, carrying a cam 38 and a ratchet-wheel 39. The cam makes operative contact with a lug 40, carried by the slide 35, and serves to move said slide in a direction away from the cylinder 20, causing a rearward movement of the plunger 32, which results in the opening of the valve 27 and the flow of oil from the pipe 11 to the interior of said cylinder 20. Extending under the plunger and the cam is a coiled tension-spring 42, one end of which is connected to the standard 19 and the opposite end of which is connected to a screw 43, carried by a perforated lug 44, depending from the slide, the screw permitting of the adjustment of the tension of the spring.

To the upper portion of the standard 17 is secured a pin or stud 46, to which is fulcrumed a lever 47, having a pair of pawls 48, one arranged on either side of the fulcrum and adapted to alternately engage with the teeth of the ratchet-wheel 39 and impart a step-by-step movement thereto. To the end of the lever 47 is pivoted a link 49, the opposite end of which is connected to a bracket 50, extending from the piston-rod or some other movable part of the engine or to any auxiliary operating mechanism.

The operation of the device will be readily understood, the step-by-step rotative movement of the ratchet-wheel serving to rotate the cam until the plunger has been moved fully to the rear and the cylinder has been filled with oil. The notched portion of the cam then comes into alinement with the lug 40 of the slide 35 and permits the accumulated potential energy of the spring to force the plunger in the direction of the valve-casing, the valve 28 opening and permitting the oil to flow toward the lubricator 10. The diameter of the plunger is comparatively small, while the strength of the spring is sufficient to overcome the steam-pressure and force the oil to the lubricator. The means of operating the ratchet-wheel and the cam may be altered to suit the varying conditions of use, the connection being made to any movable point of the engine or to an auxiliary mechanism of any character.

In so far as the action of the oil-feed cup under the influence of the steam is concerned, it will be understood that oil may be supplied to the feed cup or tube in any manner, and the latter may be of any length or shape, straight or coiled, and situated in any place where it is exposed to the action of the steam, as hereinbefore described, without departing from the spirit or sacrificing any of the advantages of the invention.

The feed-cup or containing vessel may be of any desired form, one of the simplest methods of carrying the invention into effect being merely to extend the supply-pipe 11 into the valve-chest, as indicated by dotted lines at 10' in Fig. 1, and to give more heat to the lubricant this pipe may be coiled, and thus lengthened. In this case the oil fed to the pipe will be highly heated and when expended will flow out of the open top of the pipe in the form of a spray and be caught up and carried through and against the engine-walls and parts by the steam.

The device is self-regulating, each passing volume of steam to effect a stroke of the engine carrying with it a quantity of oil, and this occurs without regard to the intervals during which the oil is fed, because it is gradually being heated more and more as it approaches the steam of the engine. When the steam is superheated and intensely dry, more oil is needed than for low-pressure steam and this automatically provided, for the reason that the higher heat of the superheated steam will cause the more complete vaporization of the oil in the feed-cup.

In Fig. 4 I have illustrated a form of feed-cup $10^a$ which has been found successful in practice. The feed-cup is in the form of an elongated narrow tapering cylinder having a large surface area for exposure to the steam and containing a comparatively small quantity of oil and loosely covered with a wire or metal gauze, although not so shown in the drawings.

I do not claim in this application the following subject-matter, which is presented by my application filed October 14, 1903, Serial No. 177,053—namely, the combination in a lubricator, of a cylinder, a plunger therefor, a chamber beyond the limit of inward movement of the plunger, inlet and outlet ports provided with valves arranged to be in continuous communication with said chamber, means for carrying the plunger outward with a slow movement and for then releasing it, and a spring for forcing the plunger inward when released.

Having thus described my invention, what I claim is—

1. A lubricating device comprising an oil cup or pipe having an outlet at its upper end covered with wire-gauze, located within the steam-chest of an engine and exposed to the action of the steam in said steam-chest; a pipe connected to the bottom of said cup for supplying oil thereto; the discharge of oil from this cup or pipe being effected through said diffusing-gauze by the heating of the oil therein due to the absorption of heat from the steam.

2. A lubricating device comprising an oil-reservoir; a force feed-pump connected therewith and comprising a tubular member; two ball check-valves of different sizes within said tubular member arranged to open in a direction away from said oil-reservoir; a spring imposed on each ball to hold said balls to their respective seats; a cylinder connected to said tubular member between said check-valves; a plunger operating within said cylinder; a sliding shuttle connected to said plunger on one side; a base-piece supporting the pump-cylinder and provided with guides for said shuttle; a tension-spring attached to the other side of said shuttle at one end and to said base at the other; a rotatable shaft having bearings in said base-piece; an eccentric cam flattened upon one side and so mounted on said rotatable shaft as to intermittently engage said sliding shuttle; a ratchet-wheel mounted on said shaft; pawls engaging said ratchet-wheel; a lever to engage and operate said pawls and means for operating said lever, substantially as and for the purposes hereinbefore described.

3. The combination in a lubricating device of an oil-reservoir, a conveying-pipe leading to a steam-chest of an engine or other point to be lubricated; two valve-seats disposed in said conveying-pipe; ball-checks therein; springs to hold said checks to their respective seats; a pump-cylinder connecting with said conveying-pipe between said check-valve seats; a plunger operating in said cylinder guided by a stuffing-box; a head on said plunger connected thereto by a flattened neck; a sliding shuttle provided with a notched standard at one end to engage the flattened neck of said plunger and having a slot therein and a lug at one end of said slot; an eccentric cam engaging said lug and operating through said slot, provided with a flattened side and an anvil-shoulder at one end of said flattened side to receive the surplus accumulated energy of said spring; a rotatable shaft to mount and operate said cam; a ratchet-wheel attached to said shaft; a frame on which said pump-cylinder, shuttle and shaft are suitably mounted; a closed tension-spring connected at one end to said shuttle and at the other end to a fixed point in said frame; a pair of pawls engaging said ratchet-wheel and a lever to actuate said pawls, fulcrumed at one end to said frame and connected to a movable part of an engine at the other, substantially as and for the purposes hereinbefore described.

4. The combination in a lubricating device of a pump comprising a ball check-valve of less diameter at the inlet-passage and a ball check-valve of greater diameter at the outlet-passage of said pump, a compression-spring interposed between said ball-checks to hold the inlet-check to its seat and a spring arranged to press upon the upper or outlet check of stronger compression than the spring holding the inlet-check to its seat, said larger spring holding the outlet-check to its seat against the pressure of said small spring; a rotatable cam; a reciprocating shuttle connected to the plunger of said pump and engaged by said rotatable cam during its withdrawing or suction stroke; a spring connected at one end to said shuttle by means of a set-screw whereby the tension of said spring may be increased or diminished, and a frame to which the other end of said spring is secured and in which said pump, shaft and shuttle are suitably mounted, substantially as and for the purposes described.

5. The combination in a lubricating device of an oil-reservoir; a pipe leading from said reservoir to the steam-chest of an engine; two check-valves and seats therefor located in said pipe; said valves being held to their respective seats by springs and arranged to open in the direction of the flow of oil from said reservoir to said steam-chest; a supporting-frame; a pump-cylinder connected to said pipe between said check-valves, provided with an exteriorly-threaded surface to mesh with an interiorly-threaded hole in said frame; a plunger operating in said pump-cylinder guided by a stuffing-box and provided with a head integral therewith connected by a flattened neck; a shuttle guided in said frame and provided with a notched standard to receive the flattened neck of said plunger and also having a slot and an abutting lug; a spring for actuating said shuttle in one direction; an eccentric cam adapted to operate in said slot and intermittently engage said lug, said cam being constructed with a flattened side and a shoulder at one end thereof to receive the excess energy of the shuttle on its pressure-stroke; a rotatable shaft journaled in said frame upon which is mounted said eccentric cam; a ratchet-wheel on said shaft; pawls engaging said ratchet-wheel and a lever to operate said pawls substantially as described.

6. The combination in a lubricating device of a frame containing the mechanism thereof comprising a bed-plate provided with a standard upon one end thereof in which is an interiorly-threaded hole and two corresponding standards disposed on either side of said bed-plate provided with bearings and guides therein, with a pump-cylinder having an exteriorly-threaded surface to mesh with the interiorly-threaded standard, a rotatable shaft journaled in the bearings of the corresponding standards, a ratchet-wheel connected to said shaft, an eccentric cam mounted on said shaft, a sliding shuttle operating in the guides of the corresponding standards and intermittently engaged by said cam, a tension-spring connected to said shuttle at one end and to a point in said frame at the other, a plunger attached to said shuttle and operating in said pump-cylinder, pawls engaging said ratchet-wheel and an actuating-lever connected to said pawls, substantially as specified.

7. In a lubricating device a pump including a plunger provided with a head integral therewith connected by a flattened neck, a shuttle provided with a notched standard to receive the flattened neck of said plunger and also provided with a slot and a lug at the end of same and with means for connecting said shuttle to one end of a tension-spring; an eccentric cam adapted to operate in said slot and to engage said lug; a tension-spring connected to said shuttle and to a fixed point, said cam and spring alternately operating said shuttle and plunger in opposite directions, substantially for the uses and purposes hereinbefore specified.

8. In a lubricating device, a spring-propelled plunger-pump, a shuttle engaging the plunger of said pump; a rotatable shaft; means for operating said shaft, including pawls and a ratchet-wheel; an eccentric cam mounted on said shaft and engaging said shuttle, said cam having a flattened side and a shoulder formed integral with said cam to determine the length of the stroke of said plunger and to receive the excessive accumulated potential force of said spring, said cam operatively engaging said shuttle and plunger on the suction-stroke substantially as and for the purposes specified.

In testimony that I claim the foregoing as my own I have hereto affixed my signature in the presence of two witnesses.

PHILO J. LOCKWOOD.

Witnesses:
ROY E. MCQUIGG.
ESTELLE BRYAN.